United States Patent [19]
Degginger

[11] 4,455,404
[45] Jun. 19, 1984

[54] RIGID, NON-ELASTOMERIC, NON-CELLULAR, AMORPHOUS METAL REINFORCED POLYETHER-URETHANE COMPOSITIONS

[75] Inventor: Edward R. Degginger, Convent Station, N.J.

[73] Assignee: Allied Corporation, Morristown, N.J.

[21] Appl. No.: 495,195

[22] Filed: May 16, 1983

[51] Int. Cl.³ ............................................... C08K 3/08
[52] U.S. Cl. .................................... 524/439; 524/440; 524/441; 524/590; 524/779; 524/780; 524/781; 524/783; 524/784; 524/785; 524/875; 428/425.8
[58] Field of Search ............... 524/439, 440, 441, 590, 524/875, 779, 780, 781, 783, 784, 785; 428/425.8; 528/66

[56] References Cited

U.S. PATENT DOCUMENTS

| | | | |
|---|---|---|---|
| 3,878,157 | 4/1975 | Olstowski et al. | 524/875 |
| 4,028,301 | 6/1977 | Olstowski | 528/66 |
| 4,251,428 | 2/1981 | Recker et al. | 524/875 |

Primary Examiner—Lewis T. Jacobs
Attorney, Agent, or Firm—Ernest D. Buff; Paul Yee

[57] ABSTRACT

Rigid, non-elastomeric, non-cellular, amorphous metal reinforced urethane compositions and methods for preparing them; said composition characterized by high flexural strength and prepared by impregnating an amorphous metal reinforced material with a polyether-urethane prepared by admixing a blend of polyethers having an average functionality of from 4.0 to about 7.5 and an average hydroxyl number of from 300 to about 600, with an organic polyisocyanate and curing said impregnated amorphous metal reinforced material.

12 Claims, No Drawings

RIGID, NON-ELASTOMERIC, NON-CELLULAR, AMORPHOUS METAL REINFORCED POLYETHER-URETHANE COMPOSITIONS

DESCRIPTION

BACKGROUND OF THE INVENTION

1. Field of the Invention

This invention relates to rigid, non-elastomeric, non-cellular amorphous metal reinforced urethane compositions and methods for preparing them.

2. Description of the Prior Art

Reinforced plastics comprising polyester resins, copolymers of polyester resins with vinyl monomers or epoxy type resinous materials reinforced with filaments or fibers of a variety of materials such as glass, nylon, cellulose, asbestos, cotton, carbon amorphous metal and the like are well known. The reinforcing materials may be present in the plastic mass in the form of fibers or filaments randomly distributed throughout the mass; or they may take the form of woven yarns spun from fibers or comprise bundles of filaments arranged in layers within the plastic. Aternatively, they may take the form of mats or felted fibers or substantially parallel filaments. The foregoing reinforced laminates, although useful for many applications, suffer from serious drawbacks which have greatly limited the application of reinforced laminates. The principal drawbacks of the foregoing commercial resins are their low interlaminar shear values, low heat distortion temperatures, and in some cases, their extremely high cost which has limited their use to applications where cost is not an item for consideration. Amorphous metals in particular have been used as a reinforcing agent for synthetic and natural rubber and the like because of the high strength which they impart to the products made therefrom. Amorphous metals when used as a reinforcing agent produce a high dimensional stability and minimum warpage in the end product. Amorphous metal reinforcing will minimize the product's tendency to take a "set" or otherwise become permanently deformed. Most of the strength of the foregoing products is due to the presence of the amorphous metal with the resin serving principally as a binder or matrix to prevent movement of the amorphous metal filaments. However, the strength of the resin is very important if the product is to be subject to any kind of flexure, shear or torque. In this instance, the resin is the limiting strength factor because it prevents the reinforcing filaments from breaking apart or sliding over one another (interlaminar shear). The resin is also the limiting factor on the temperature at which the product can be used, so it is desirable to have the resin as resistant to heat as possible.

SUMMARY OF THE INVENTION

The present invention provides novel rigid, noncellular, non-elastomeric urethane resin impregnating materials for amorphous metal reinforcement which are both more efficient and more economical than the impregnating materials previously employed. In addition, the present invention provides amorphous metal reinforced rigid, noncellular, non-elastomeric polyether-urethane compositions characterized by high resistance to interlaminar shear. The resin comprises (I) a polyether-urethane prepared by admixing (a) a blend of polyethers having an average functionality of from about 4.0 to about 7.5 and an average hydroxyl number of from about 300 to 600, said polyether blend being a member selected from the group consisting of (1) polyethers obtained by reacting at least one alkaline oxide selected from the group consisting of ethylene oxide and propylene oxide with a mixture of polyhydric alcohols selected from the group consisting of polyhydric alcohols containing from 2 to about 8 hydroxyl groups and (2) a mixture of at least two different preformed polyethers obtained by reacting at least one of said alkaline oxides with a polyhydric alcohol selected from the group consisting of polyhydric alcohols containing from 2 to about 8 hydroxyl groups with (b) an organic polyisocyanate wherein the NCO:OH ratio is about 0.8:1 to about 1.3:1 and (II) an amorphous metal reinforcing material, wherein said polyether-urethane composition is cured in intimate contact with said amorphous metal reinforcing material.

DESCRIPTION OF THE PREFERRED EMBODIMENTS

Non-cellular urethane resins have been reported in the literature and are commercially available. These products differ from the non-cellular urethane resins of the present invention in that the prior art urethanes are elastomeric, viz., these resins have elongations in excess of 100% and when stretched will return to their original length when the stress is relieved. Whereas the noncellular urethane resins of the present invention are nonelastomeric, viz., the unfilled resins have elongation values of less than 100% and preferably have elongation values ranging from about 6% to about 25%.

The distinctive properties of these non-cellular, rigid urethanes are attributed to the polyether composition employed. A combination of polyethers, prepared either through the addition of alkaline oxides to mixed polyhydric alcohol initiators or polyethers prepared by blending two or more polyethers is employed. The polyethers responsible for the unique properties of the urethane resin are mixtures of polyethers prepared by either of the above methods where the polyhydric alcohols employed are used in such proportions, in consideration of their functionality, that the resulting average functionality of the polyether is between 4.0 and 7.5. These mixtures can be achieved by judicious combinations of any of the following: propylene glycol, 1,2,6-hexanetriol, glycerol, trimethylol propane, pentaerithritol, sorbitol, methyl glucoside, sucrose and the like. The presence of water and catalysts present in most polyether preparations contribute to the formation of bifunctional polyether and reduce the functionality below that of the polyhydric alcohol initiators employed.

The polyethers are prepared by the condensation of propylene oxide or mixtures of propylene oxide and additional alkaline oxides such as ethylene oxide provided such mixtures do not contain more than 20 mol percent of the additional oxide. The condensation reaction may be carried out in the presence of a suitable catalyst by heating a mixture of the alkaline oxide and initiator at sufficiently high temperature to effect the desired reaction.

The preferred method for carrying out the reaction is to add the alkaline oxide components gradually to a stirred, heated mixture of the desired initiator system and alkaline catalyst, such as sodium or potassium hydroxide. The temperature at which the reaction is run will depend upon the particular system employed and the concentration of the catalyst in the system. The temperatures required for any given reaction will vary from about 50°–150° C., preferably 80°–130° C., depending on the initiators and the type and concentration of catalysts employed.

In order to be acceptable for the production of the novel rigid, non-cellular, non-elastomeric urethane resins of the instant invention, the polyethers thus produced must have a functionality of 4.0–7.5. If a mixture of two or more polyethers is employed where one of the polyethers has a functionality below 4.0 such as polyethers initiated on glycerol and the other has a functionality above 4.0 such as polyethers initiated on hexols, or octols, the ratio of high and low functionality polyethers which may be employed in the foregoing mixtures extends from about 70:30 to 30:70 equivalent percent so long as the resulting blend has an average functionality within the range of 4.0 to 7.5. Likewise, when the polyether is formed by coinitiators, viz., a mixture of triol and hexols or octols, the ratio of triol to hexol or octol may range from about 30:70 to 70:30 equivalent percent so long as the resulting polyether has a functionality within the range of 4.0 to 7.5. The polyethers employed in the preparation of the novel urethane resins of the instant invention shall have, in addition to the foregoing limitations respecting functionality, a hydroxyl number of between 300 and 600. The hydroxyl number represents the number of milligrams of KOH equivalent to the hydoxyl content of 1 gram of the polyether.

Basically, the novel urethane resins of the instant invention are produced through the combination of a polyisocyanate with or without catalysts and a polyether mixture having an average functionality of 4.0–7.5 and a hydroxyl number within the range of 300 to 600. The polyisocyanate employed may be any one or mixture of those conventionally employed in polyether urethane production such as, hexamethylene diisocyanate, naphthalene-1,5diisocyanate, tolyene diisocyanate, 4,4'-diphenyl-methane diisocyanate, 1,4-phenylene diisocyanate, 4,4'-diphenyldiisocyanate, polymethylene polyphenylisocyanate and the like with the 80/20 mixture of the 2,4- and 2,6-isomers of tolylene diisocyanate being preferred. The polyether urethane is formulated with polyisocyanates using an NCO/OH ratio of from 1.3/1.0 to 0.8/1.0 with the preferred ratio being from 1.1/1.0 to 0.95/1.0.

The methods of combining the polyether and polyisocyanates are several and depend to a certain extent on whether the final product is to be cast, compression molded, applied to fiber for filament winding, rotationally cast, thermoformed, etc. Typical methods of combining are:

(A) One-shot method.

In the one-shot method, any of the aforementioned polyethers or blends of these polyethers are reacted after degassing with one of the polyisocyanates mentioned above in an NCO/OH ratio of 0.8/1 to 1.3/1 at temperatures ranging from about 20° C. to about 80° C., preferably about 50° C. and subsequently converted to the resin by curing at elevated temperatures ranging from about 100° C. to about 140° C.

(B) Prepolymer method.

In the prepolymer method, any of the above mentioned polyether mixtures is reacted with a sufficient excess of polyisocyanate to achieve a stable liquid. This, as part A, is reacted with remainder of the same polyether mixture or another polyether mixture (part B) to effect the required NCO/OH ratio from 0.8/1.0 to 1.3/1.0. After combining and degassing part A and part B, the urethane mixture is poured into a mold and subsequently converted into the desired product by curing at elevated temperatures ranging from about 100° C. to 140° C.

The above systems may be handled largely in the absence of catalysts; however, a wide variety of known catalysts, such as the organo-metallic compounds, i.e., dibutyltin dilaurate, phenylmercuric propionate and tertiary amines, i.e., triethylamine may be employed where required for certain applications.

The following examples are given to illustrate amorphous metal reinforced compositions comprising polyether-urethane compositions of the present invention.

EXAMPLE I

One-Shot Method

Into a resin flask equipped with a motor driven stirrer, thermometer, and vacuum outlet tube was charged 100 parts by weight (p.b.w.) of a polyether prepared by propoxylating a 50/50 equivalent percent mixture of glycerol and sorbitol to a hydroxyl number of 443 (approx. molecular weight of 500). With stirring, the temperature of the polyether was raised to 75° C. and this temperature was maintained for 30 minutes while the polyether was degassed under a vacuum of 3 to 10 mm. Hg. At the end of this time, the polyether was cooled to 50° C. and 68.8 p.b.w. of an 80/20 mixture of 2,4- and 2,6-tolylene diisocyanate was added to the polyether. Degassing with stirring was then continued for 1 to 5 minutes. At the end of this time the mixture was poured into a preheated mold treated with a suitable mold release agent. The mold was then transferred to an oven and heated for one hour at 100° C. and two hours at 140° C. The properties of the resulting non-cellular urethane resin appear in the table of resin properties which follows the examples.

EXAMPLE II

One-Shot Method

Into a resin flask equipped with a motor driven stirrer, thermometer, and a vacuum outlet tube was charged 100 p.b.w. of a polyether, prepared by propoxylating 30/70 equivalent percent mixture of glycerol and sorbitol to a hydroxyl number of 349 (approx. molecular weight of 738). With stirring, the temperature of the polyether was raised to 75° C. and this temperature was maintained for 30 minutes while the polyether was degassed under a vacuum of 3 to 10 mm. Hg. At the end of this time, the polyether was cooled to 50° . and 54.2. p.b.w. of an 80/20 mixture of 2,4- and 2,6-tolylene diisocyanate was added to the polyether. Degassing was then continued for 1 to 5 minutes. At the end of this time, the mixture was poured into a preheated mold treated with a suitable mold release agent. The mold was then transferred to an oven and heated for one hour at 100° C. and two hours at 140° C. The properties of the resulting non-cellular urethane resin appear in the table of resin properties, which follows the examples.

EXAMPLE III

One-Shot Method

Into a resin flask equipped with a motor driven stirrer, thermometer, and vacuum outlet tube was charged 100 p.b.w. of a polyether prepared by propoxylating a 40/60 equivalent percent mixture of glycerol and sucrose to a hydroxyl number of 466 (approx. molecular weight of 667). With stirring, the temperature of the polyether was raised to 75° C. and this temperature was maintained for 30 minutes while the polyether was degassed under a vacuum of 3 to 10 mm. Hg. At the end of this time, the polyether was cooled to 25° C. and 72.3 p.b.w. of an 80/20 mixture of 2,4- and 2,6-tolylene diisocyanate was added to the polyether. Degassing was then continued for 1 to 5 minutes. At the end of this time, the mixture was poured into a preheated mold treated with a suitable mold release agent. The mold was then transferred to an oven and heated for one hour at 110° C. and two hours at 140° C. The properties of the resulting non-cellular urethane resin appear in the table of resin properties which follows the examples.

EXAMPLE IV

Prepolymer Method (A) Into a resin flask equiped with a motor driven stirrer, thermometer, and nitrogen inlet tube were charged 320 p.b.w. of an 80/20 mixture 2,4- and 2,6-tolylene diisocyanate and 50 p.b.w. of a polyether, prepared by propoxylating a 50/50 equivalent percent mixture of glycerol and sorbitol to a hydroxyl number of 443 (approx. molecular weight of 500). The mixture was stirred under a blanket of dry nitrogen gas with a minimum amount of heat. After the peak exotherm was reached, the mixture was allowed to cool to 80° C., and an additional 50 p.b.w. of the aforementioned polyether was added. The mixture was stirred while maintaining the temperature at 80°-90° C. under a blanket of dry nitrogen gas for two hours. This material represents part A of the two-component system.

(B) Into a resin flask as described above was charged 360 p.b.w. of the polyether as described in A, and it was degassed at 75° C. for 30 minutes under a vacuum of 3-10 mm. Hg. At the end of this time, the mixture was cooled to 50° C. This product represents part B in this two-component system.

(C) Part A and part B were combined and degassed with stirring for 1 to 5 minutes. At the end of this time, the mixture was poured into a preheated mold which had been treated with a suitable mold release agent. The mold was then transferred to an oven and heated for one hour at 100° C. and two hours at 140° C.

EXAMPLES V-X

One-Shot Method

The procedures outlined in Example 1 above were repeated except that the polyethers employed were as follows:

Ex. V—a 40/60 mixture of glycerol/sucrose propoxylated to a hydroxyl number of 528.

Ex. VI—a 50/50 mixture of glycerol-sorbitol propoxylated to a hydroxyl number of 401.

Ex. VII—a 50/50 mixture of glycerol/sorbitol propoxylated to a hydroxyl number of 352.

Ex. VIII—a 70/30 mixture of glycerol/sorbitol propoxylated to a hydroxyl number of 356.

Ex. IX—a 70/30 mixture of glycerol/sucrose propoxylated to a hydroxyl number of 353.

Ex. X—a 40/60 mixture of glycerol/sucrose propoxylated to a hydroxyl number of 343.

The properties of the rigid, non-cellular, nonelastomeric urethane compositions prepared in accordance with the foregoing examples appear in the following table.

TABLE 1

| TABLE OF PHYSICAL PROPERTIES OF NON-REINFORCED RESIN | | | | | | | | | | |
|---|---|---|---|---|---|---|---|---|---|---|
| Example | I | II | III | IV | V | VI | VII | VIII | IX | X |
| Hydroxyl number | 443 | 349 | 466 | 443 | 528 | 401 | 352 | 356 | 353 | 343 |
| Initiator ratio | 50/50 | 30/70 | 40/60 | 50/50 | 40/60 | 50/50 | 50/50 | 70/30 | 30/70 | 40/60 |
| Ultimate tensile strength, psi | 12,760 | 9,480 | 13,520 | 12,760 | 16,666 | 10,860 | 10,199 | 9,560 | 9,720 | 9,330 |
| Ultimate elongation, percent | 15.0 | 18.2 | 14.3 | 15.0 | 6.2 | 16.1 | 14.0 | 15.8 | 21.1 | 19.2 |
| Flexural strength, psi | 12,710 | 15,800 | 20,020 | 20,710 | 25,449 | 17,040 | 16,390 | 15,570 | 16,700 | 15,910 |
| Flexural modulus, psi | 515,660 | 470,780 | 518,220 | 515,660 | 536,347 | 478,510 | 490,360 | 452,370 | 468,220 | 479,100 |
| Oompressive Strength, psi | 17,780 | 12,880 | 19,350 | 17,780 | 21,370 | 12,980 | 14,320 | 13,330 | 14,630 | 14,160 |
| Izod notched impact strength, ft.-lb./in. notch | 0.70 | 0.50 | 0.39 | 0.70 | 0.30 | 0.50 | 0.64 | 0.83 | 0.49 | 0.54 |
| Heat distortion temperature, 264 psi fiber stress, ° C. | 100 | 71 | 116 | 100 | 140 | 78 | 73 | 72 | 91 | 96 |

Rigid, non-cellular, non-elastomeric urethane resins such as those described in the foregoing examples have been found to be particularly well adapted for use as a matrix in amorphous metal reinforcing applications because of their exceptional adherence to amorphous metal strip and the unusually high flexural strength values of the resulting resin amorphous metal reinforced laminates. The term "amorphous metal" as used herein refers to a noncrystalline substance; that is, a substance substantially lacking any long range order. In distinguishing an amorphous or "glassy" substance from a crystalline substance, X-ray diffraction measurements are generally suitably employed. Additionally, transmission electron micrography and electron diffraction can be used to distinguish between the glassy and the crystalline state.

A glassy metal produces an X-ray diffraction profile in which intensity varies slowly with diffraction angle. Such a profile is qualitatively similar to the diffraction profile of a liquid or ordinary window glass. On the other hand, a crystalline metal produces a diffraction profile in which intensity varies rapidly with diffraction angle.

These glassy metals exist in a metastable state. Upon heating to a sufficiently high temperature, they crystallize with evolution of a heat of crystallization, and the diffraction profile changes from one having glassy characteristics to one having crystalline characteristics.

It is possible to produce a metal which is a two-phase mixture of the glassy and the crystalline state; the relative proportions can vary from totally crystalline to totally glassy. A glassy metal, as employed herein, refers to a metal which is primarily glassy, but which may have a small fraction of the material present as included crystallites. Substantially glassy metals are preferred, due to an increase in ductility with an increase in glassiness.

Compositions of matter comprising rigid noncellular, non-elastomeric polyether urethane as the matrix and amorphous metal strip are highly valuable. Especially those compositions containing amorphous metal strip in proportions of from 75% to 40% and preferably from 65% to 50% based on the weight of the total composition have proved to be very advantageous from the standpoint of improved strength properties.

Various processing techniques may be employed in the preparation of the amorphous metal reinforced compositions of the present invention such as:

(1) Casting.

A plastic object is formed by pouring a mixture comprising a fluid polyether urethane and amorphous metal strip into a mold where the bonding reaction is completed with or without the application of heat but in the absence of applied pressure.

(2) Compression molding.

A technique of molding in which the molding composition comprising the polyether urethane and amorphous metal reinforcement is placed in an open mold cavity, the mold is then closed, and heat and pressure are applied until the material has cured.

(3) Laminating.

A method by which superimposed layers of polyether urethane coated amorphous metal reinforcement are bonded together usually by means of heat and pressure, to form a single piece.

(4) Filament winding.

A method by which a polyether urethane coated amorphous metal reinforcement is wound on a ribbon winding machine and the resin is allowed to cure to give an amorphous metal reinforced structure.

We have found the rigid, non-cellular, nonelastomeric urethane resins of the present invention to be particularly well adapted to amorphous metal ribbon winding applications because of their exceptional adherence to amorphous metal, their rapid coating action with amorphous metal ribbon and the unusually high resistance to interlaminar shear of the amorphous metal reinforced structures.

Amorphous metal winding was developed to capitalize on the tremendous strength of amorphous metal. As noted previously, most of the strength of amorphous metal. As noted previously, most of the strength in the glassy metal wound product is due to the amorphous metal reinforcing material with the resin serving principally as a binder to distribute stress and to prevent movement of the metal strip. However, the strength of the resin is very important if the wound product is to be subject to any kind of flexure, shear, or torque. In such instances, the resin is the limiting strength factor because it prevents the amorphous metal strip portions from breaking apart or sliding over one another.

Glassy metal strip wound plastic structures are usually prepared by coating continuous strip with thermosetting resin by dipping the strip in a resin bath followed by winding the resulting coated strip under tension, on a suitable mandrel. The resulting wound structure is subjected to heating to facilitate the curing of the resin. Some structures are also cured under pressure. In the process of the present invention, amorphous metal ribbon is fed directly from packages to a comb located above the packages, then down into a resin bath in which the ribbon is passed over rollers which flex the ribbon while it is exposed to the resin. The thus coated ribbon is then passed through a guiding eye and on to the winding mandrel where it is wound in a suitable pattern. As soon as the desired thickness is attained, the winding is completed, the mandrel removed from the ribbon winding machine and the resin-coated winding is heated to accelerate the curing process. Curing temperatures may range between 25° C. and 180° C. and the curing cycle maintained for a period of from 5 to 60 minutes. After removal of the cured part from the mandrel, it is subjected to a post cure at about 100° C. to 140° C. for about 1–4 hours. The presence or absence of catalysts determines the severity of the curing conditions.

Where pressure is employed during curing, as for example when flat or relatively flat shapes are wound, the freshly wound mandrel is transferred to a press where a pressure of from 50 p.s.i. to 500 p.s.i., preferably from 100 p.s.i. to 400 p.s.i., is maintained on the pressure blocks of the mandrel with heat being applied. The same temperature and time intervals apply as in the aforementioned cure and post cure operations.

While the foregoing examples have been limited to a specific embodiment, it is to be understood that the invention is not limited to such specific examples which have been offered for purposes of illustration only and that other amorphous metal reinforcing materials, such as that in the form of wire, woven fabric and the like, may be substituted without departing from the spirit or scope of the invention.

I claim:

1. A rigid, non-elastomeric, non-cellular, reinforced urethane composition, characterized by high flexural strength properties, comprising (I) a polyether urethane prepared by admixing (a) a blend of polyethers having an average functionality of from about 4.0 to about 7.5 and an average hydroxyl number of from about 300 to 600, said polyether blend being a member selected from the group consisting of (1) polyethers obtained by reacting at least one alkaline oxide selected from the group consisting of ethylene oxide and propylene oxide with a mixture of polyhydric alcohols selected from the group consisting of polyhydric alcohols containing from 2 to about 8 hydroxyl groups and (2) a mixture of at least two different preformed polyethers obtained by reacting at least one of said alkaline oxides with a polyhydric alcohol selected from the group consisting of polyhydric alcohols containing from 2 to about 8 hydroxyl groups with (b) an organic polyisocyanate wherein the NCO:OH ratio is about 0.8:1 to about 1.3:1 and (II) an amorphous metal reinforcing material, wherein said polyether-urethane composition is cured in intimate contact with said amorphous metal reinforcing material.

2. The composition as claimed in claim 1 wherein said polyether blend is obtained by reacting at least one of said alkaline oxides with a mixture of polyhydric alcohols selected from the group consisting of polyhydric alcohols containing from 2 to about 8 hydroxyl groups.

3. The composition as claimed in claim 2 wherein said alkaline oxide is a mixture of propylene oxide containing up to about 20 mol percent ethylene oxide and said mixture of polyhydric alcohols consists of glycerol and sucrose.

4. The composition as claimed in claim 1 wherein said curing step is accomplished by heating in the presence of a catalyst selected from the group consisting of organo-metallic and tertiary amine compounds.

5. The composition as claimed in claim 1 wherein said NCO:OH ratio is from about 0.95:1 to about 1.1:1.

6. The composition as claimed in claim 1 wherein said amorphous metal reinforcing material is present in an amount of from 40% to 75% by weight based on the weight of the composition.

7. The composition of claim 1 wherein the curing is effected at a temperature from 25° C. to 180° C.

8. The method of producing shaped plastic articles characterized by high flexural strength properties which comprises, providing an amorphous metal reinforcing material, contacting said amorphous metal material with a polyether-urethane resin prepared by admixing (I) a blend of polyethers having an average functionality of from about 4.0 to about 7.5 and an average hydroxyl number of from about 300 to about 600, said polyether blend being a member selected from the group consisting of (a) polyethers obtained by reacting at least one alkaline oxide selected from the group consisting of ethylene oxide and propylene oxide with a mixture of polyhydric alcohols selected from the group consisting of polyhydric alcohols containing from 2 to about 8 hydroxyl groups and (b) a mixture of at least two different preformed polyethers obtained by reacting at least one of said alkaline oxides with a polyhydric alcohol containing from 2 to about 8 hydroxyl groups with (2) an organic polyisocyanate wherein the NCO:OH ratio is about 0.8:1 to about 1.3:1, shaping and curing the contacted material to obtain the desired product.

9. The method as claimed in claim 8 wherein said blend of polyethers is obtained by reacting at least one of said alkaline oxides with a mixture of polyhydric alcohols selected from the group consisting of polyhydric alcohols containing from 2 to about 8 hydroxyl groups.

10. The method as claimed in claim 8 wherein said curing step is carried out at elevated temperatures ranging from about 100° C. to about 140° C.

11. The method as claimed in claim 8 wherein said amorphous metal reinforcing material is in strip form and is present in an amount of from 40% to 75% by weight based on the weight of the composition.

12. The method of claim 8 wherein the curing is effected at a temperature from 25° C. to 180° C.

* * * * *